(12) United States Patent
Best

(10) Patent No.: US 12,118,132 B2
(45) Date of Patent: Oct. 15, 2024

(54) MEMORY BUS PROTECTION

(71) Applicant: CRYPTOGRAPHY RESEARCH, INC., San Jose, CA (US)

(72) Inventor: Scott Best, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 615 days.

(21) Appl. No.: 17/266,369

(22) PCT Filed: Aug. 6, 2019

(86) PCT No.: PCT/US2019/045335
§ 371 (c)(1),
(2) Date: Feb. 5, 2021

(87) PCT Pub. No.: WO2020/033428
PCT Pub. Date: Feb. 13, 2020

(65) Prior Publication Data
US 2021/0319145 A1  Oct. 14, 2021

Related U.S. Application Data

(60) Provisional application No. 62/717,619, filed on Aug. 10, 2018, provisional application No. 62/792,757, filed on Jan. 15, 2019.

(51) Int. Cl.
*G06F 21/85* (2013.01)
*G06F 7/58* (2006.01)
(Continued)

(52) U.S. Cl.
CPC .............. *G06F 21/85* (2013.01); *G06F 7/588* (2013.01); *G06F 11/1004* (2013.01); *G06F 21/45* (2013.01); *G06F 21/72* (2013.01)

(58) Field of Classification Search
CPC .......... G06F 21/85; G06F 21/72; G06F 21/79; G06F 12/14; G06F 12/1425–1441
See application file for complete search history.

(56) References Cited

U.S. PATENT DOCUMENTS 8,726,037 B2    5/2014  Pean et al.
9,030,889 B2 *  5/2015  Norman ................ G11C 16/10
                                                    365/189.16
(Continued)

FOREIGN PATENT DOCUMENTS

KR   10-2017-0095155 A   8/2017
WO   WO-2017-129184 A1   8/2017

OTHER PUBLICATIONS

EP Extended European Search Report with Mail Date Apr. 14, 2022 re: EP Application No. 19847333.2. 6 pages.
(Continued)

*Primary Examiner* — Daniel B Potratz
(74) *Attorney, Agent, or Firm* — Lowenstein Sandler LLP

(57) ABSTRACT

A first address bus may be located in an upper layer of an integrated circuit that is associated with a memory and a memory controller. The first address bus may receive a first portion of a memory address. A second address bus may be located in a lower layer of the integrated circuit where the second address bus is to receive a second portion of the memory address. Furthermore, a data bus may be located in an intermediate layer where the data bus is to receive data corresponding to the memory address from the memory and may transmit the data to the memory controller. The intermediate layer may be between the upper layer and the lower layer. A layout of the signals of the data bus may vertically overlap with a layout of signals of the first address bus and a layout of signals of the second address bus.

20 Claims, 5 Drawing Sheets

(51) Int. Cl.
     *G06F 11/10*     (2006.01)
     *G06F 21/45*     (2013.01)
     *G06F 21/72*     (2013.01)

(56) References Cited

U.S. PATENT DOCUMENTS

| | | |
|---|---|---|
| 9,972,398 B2 | 5/2018 | Thacker, III |
| 10,523,433 B1 * | 12/2019 | Monahan ................ H04L 9/088 |
| 2006/0171247 A1 | 8/2006 | Hoppe et al. |
| 2006/0287742 A1 | 12/2006 | Khan et al. |
| 2011/0309468 A1 | 12/2011 | Oh et al. |
| 2014/0104920 A1 | 4/2014 | Ikegami et al. |
| 2018/0137311 A1 | 5/2018 | Liu et al. |
| 2019/0050702 A1 | 2/2019 | Ko et al. |

OTHER PUBLICATIONS

Helfmeier, Clemens et al., "Breaking and Entering Through the Silicon", Computer & Communications Security, ACM, 2 Penn Plaza, Suite 701, New York, NY 10121-0701 USA, Nov. 4, 2013, pp. 733-744, XP058034093, DOI: 10.1145/2508859.2516717, ISBN: 978-1-4503-2477-9, Section 5.3, p. 741-p. 742. 11 pages.
Kommerling, Oliver et al., "Design Principles for Tamper-Resistant Smartcard Processors", USENIX The Advanced Computing Systems Association, USENIX Workshop on Smartcard Technology, Chicago, Illinois, USA, May 10-11, 1999. XP061012603. 13 pages.
Notification of Transmittal of the International Search Report and the Written Opinion of the International Searching Authority, or the Declaration With Mail Date Oct. 16, 2019 re: Int'l Appln. No. PCT/US2019/045335. 13 Pages.

* cited by examiner

MEMORY BUS PROTECTION

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
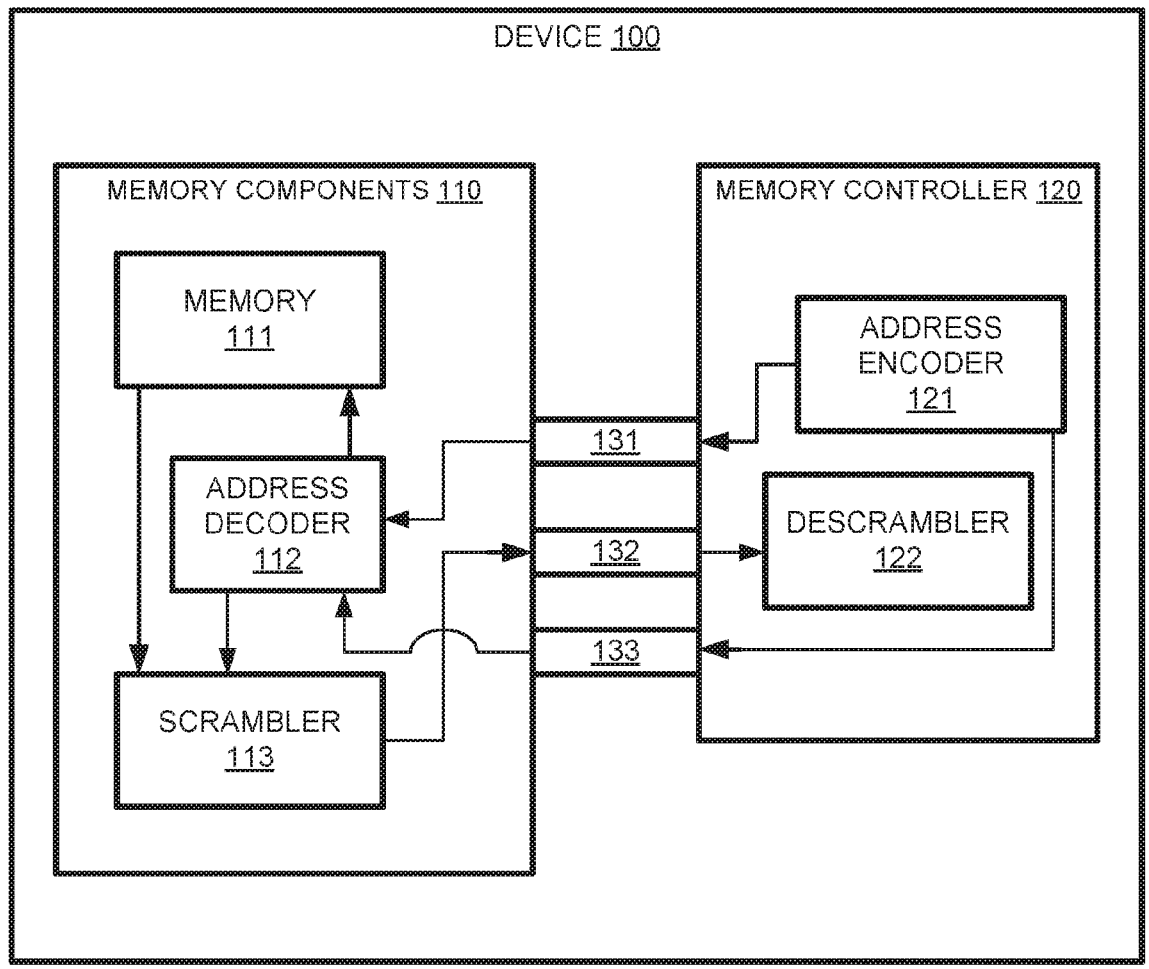
FIG. 1 illustrates an example device with memory bus protection in accordance with some embodiments of the present disclosure.

Aspects of the present disclosure are directed to on-chip memory bus protection. A semiconductor device may include a memory controller that transmits certain information to the memory in order to retrieve data stored at the memory. A memory bus may be coupled between the memory controller and the memory and may be used to transmit data between the memory controller and the memory. For example, a first signal (or group of signals) of the memory bus may be used to transmit at least one of a memory address along with a memory command (collectively referred to below as a "command/address" signal) to the memory and a second signal (or group of signals) of the memory bus may be used to return data stored at the memory that corresponds to the memory address.

The memory may store secret data such as cryptographic keys or other such information. An attacker (e.g., an unauthorized entity) may seek to obtain the secret data stored at the memory. For example, the attacker may attempt to compromise the memory bus between the memory and the memory controller in order to retrieve the secret data. Such an attack may involve a visual inspection of an integrated circuit to identify the memory bus between the memory and the memory controller in the integrated circuit. For example, the physical appearance of the memory controller in the integrated circuit may be distinct from the physical appearance of the memory. For example, the memory may appear as an ordered or distinct pattern at a region of the integrated circuit while the memory controller may appear as random logic or connections at another region of the integrated circuit. From this region identification, an attacker may readily identify the interface signals which include the memory bus that is likely present between the two different regions of the integrated circuit.

Once the attacker has identified the location of the memory bus, the attacker may attempt various so-called "invasive attack" techniques to compromise the memory bus. For example, the attacker may utilize a focused ion beam ("FIB") technique that utilizes a focused beam of ions to remove portions or layers of the integrated circuit ("IC") and to expose a particular layer of the integrated circuit that corresponds to a signal of the memory bus. By use of the FIB equipment, the attacker may then modify the IC by creating an opening to the signal of interest and then adding a new signal probe which electrically attaches to the signal of interest. The creation of the opening and the adding of a new signal probe may be performed for each signal of the memory bus that is used to transmit the memory command/address from the memory controller to the memory. The attacker may further create new openings and new signal probes to one or more signals of the memory bus that is used to transmit the data from the memory to the memory controller. Subsequently, the attacker may use the new signal probes to transmit each memory command/address over the compromised memory bus to the memory and retrieve the returned data from the memory as the data is transmitted back to the memory controller. Thus, the secret data stored at the memory may be obtained by the attacker when the memory bus has been compromised.

Aspects of the present disclosure address the above and other deficiencies by protecting the on-chip memory bus between the memory and the memory controller. For example, the memory bus may include multiple groups of signals. An initial group of the signals may be used to transmit a portion of at least one of a memory command and a memory address from the memory controller to the memory. A final group of the signals may be used to transmit a remaining portion of the memory command/address from the memory controller to the memory. Furthermore, an intermediate group of signals may be physically located between the initial group of the signals and the final group of the signals of the memory bus. The intermediate group of signals may be used to transmit the data associated with the command/address from the memory to the memory controller.

Each of the different groups of signals may be present at a different layer of the integrated circuit. For example, an upper layer of the integrated circuit (e.g., for an IC constructed with 7 layers of metal interconnect available, the upper layer for this memory interface can be built using the $5^{th}$ metal layer, also known as "metal-5" in IC parlance) may include the initial group of signals, an intermediate layer of the integrated circuit may include the intermediate group of signals e.g., using the $4^{th}$ metal layer, i.e. "metal-4"), and a lower layer of the integrated circuit may include the final group of the signals (e.g., using the $3^{rd}$ metal layer, i.e. "metal-3"). Each of the different groups of signals at the different layers may thus be at different vertical positions or layers of the integrated circuit with respect to each other. For example, the intermediate group of signals at the intermediate layer may be below the initial group of signals at the upper layer and above the final group of signals at the lower layer. The intermediate group of signals may be positioned to vertically overlap at the same location of the intermediate layer as the initial and final groups of signals are at the upper and lower layers. Thus, the intermediate group of signals may be surrounded (in vertical orientation) or "shielded" by the initial and final groups of signals at different layers of the integrated circuit.

Since the memory address is separated and different portions are transmitted via the groups of signals at the upper layer and the lower layer, the signals used to transmit the memory address may be considered to shield the intermediate layer that includes the signals used to transmit the corresponding data. As such, an attacker that utilizes the FIB technique may need to create multiple openings and multiple new signal probes for the groups of signals at both the upper layer and the lower layer while also creating an opening and new signal probe for the group of signals at the intermediate layer. Also, due to the vertical alignment of the electrical traces, any exposure of the intermediate layer necessarily results in a disruption to either the upper or lower layer. Thus, in order to transmit all potential memory addresses (and, optionally, memory commands) over the memory bus to retrieve all of the corresponding data at the memory, the attacker would need to use a large number of new signal probes to correct for these disruptions and to insert each of the potential memory addresses into the memory bus. However, the FIB technique may only be able to insert a limited number of new signal probes at any given time. Thus, since the memory address is split between different layers of the integrated circuit, the number of new signal probes that are needed to compromise the memory bus may exceed the capacity to add new signal probes by the FIB technique. Thus, the attacker would not be able to compromise the memory bus by inserting each memory address (and, optionally, memory commands) into the memory bus and would not be able to retrieve all of the data stored at the memory.

In some embodiments, the data transmitted on the memory bus may further be encoded. For example, a random value (i.e., a "number used once" value, also known as a "nonce" value in cryptographic parlance) may be provided with the different portions of the memory address and the data that is returned via the memory bus may be encoded based on the random value. The data may be encoded based on a different random value each time that the data is transmitted from the memory to the memory controller. Thus, the data transmitted over the memory bus may be further protected from an attack as the attacker would need to further retrieve the random value in order to compromise the memory bus.

Advantages of the present disclosure include, but are not limited to, an increase in the security of the integrated circuit or a device that includes the integrated circuit. For example, the protection of the memory bus may prevent or substantially delay the attacker from compromising the memory bus and retrieving the secret data stored at the memory. Furthermore, since the secret data may be used during the operation of a device (e.g., as a cryptographic key), then the operations of the device may also be considered more secure from the attacker as the cryptographic key may not be retrieved and subsequently duplicated at another device used by the attacker.

FIG. 1 illustrates an example device 100 with memory bus protection. As shown, the device 100 may include a memory bus represented by various groups of signals 131, 132, and 133. The device 100 may include an integrated circuit with memory components 110 and a memory controller 120 that are coupled by the memory bus represented by the group of signals 131, 132, and 133.

As shown in FIG. 1, the memory controller 120 may include an address encoder 121 and a descrambler component 122. The memory controller 120 may receive a request to retrieve data stored at the memory 111 of the memory components 110. For example, the request may identify a particular memory address of the memory 111 for which data at the particular memory address is to be retrieved. In response to receiving the request, the memory address of the request may be encoded by the address encoder 121. The memory controller 120 may then separate the encoded memory address into two separate portions. A first portion of the encoded memory address may then be transmitted over the group of signals 131 and a second remaining portion of the encoded memory address may be transmitted over the group of signals 133.

The memory components 110 may include the memory 111, address decoder 112, and a scrambler component 113. The memory 111 may be a non-volatile memory. An example of the non-volatile memory is a one-time programmable (OTP) memory. An OTP memory may be a type of digital memory where the setting of each bit of the OTP memory is locked by a fuse (e.g., an electrical fuse associated with a low resistance and designed to be permanently break an electrically conductive path after the programming or setting of a corresponding bit) or an anti-fuse (e.g., an electrical component associated with an initial high resistance and designed to permanently create an electrically conductive path after the programming or setting of a corresponding bit). As such, the bits of the OTP memory may be programmed once and may not be changed once programmed. Although an OTP memory is described, the memory 111 may be any other type of memory or component that stores data.

The address decoder 112 may receive the first portion of the encoded memory address from the group of signals 131 and the second portion of the encoded memory address from the group of signals 133. The portions may be combined and the address decoder 112 may decode the encoded memory address to retrieve the memory address. Subsequently, the address decoder 112 may provide an instruction to the memory 111 to retrieve data at the memory address. In some embodiments, the memory 111 may store different data at different memory addresses. The memory 111 may return the data stored at the particular memory address that matches the decoded memory address from the address decoder 112. The scrambler component 113 may subsequently encode the data from the memory 111. As further described below, the data may be encoded based on a random value that is provided from the memory controller 120. The encoded data may then be transmitted over the group of signals 132 of the memory bus to the descrambler component 122 of the memory controller 120. Subsequently, the descrambler 122 may decode the encoded data based on the random value that was previously used to encode the data.

Figure 2:
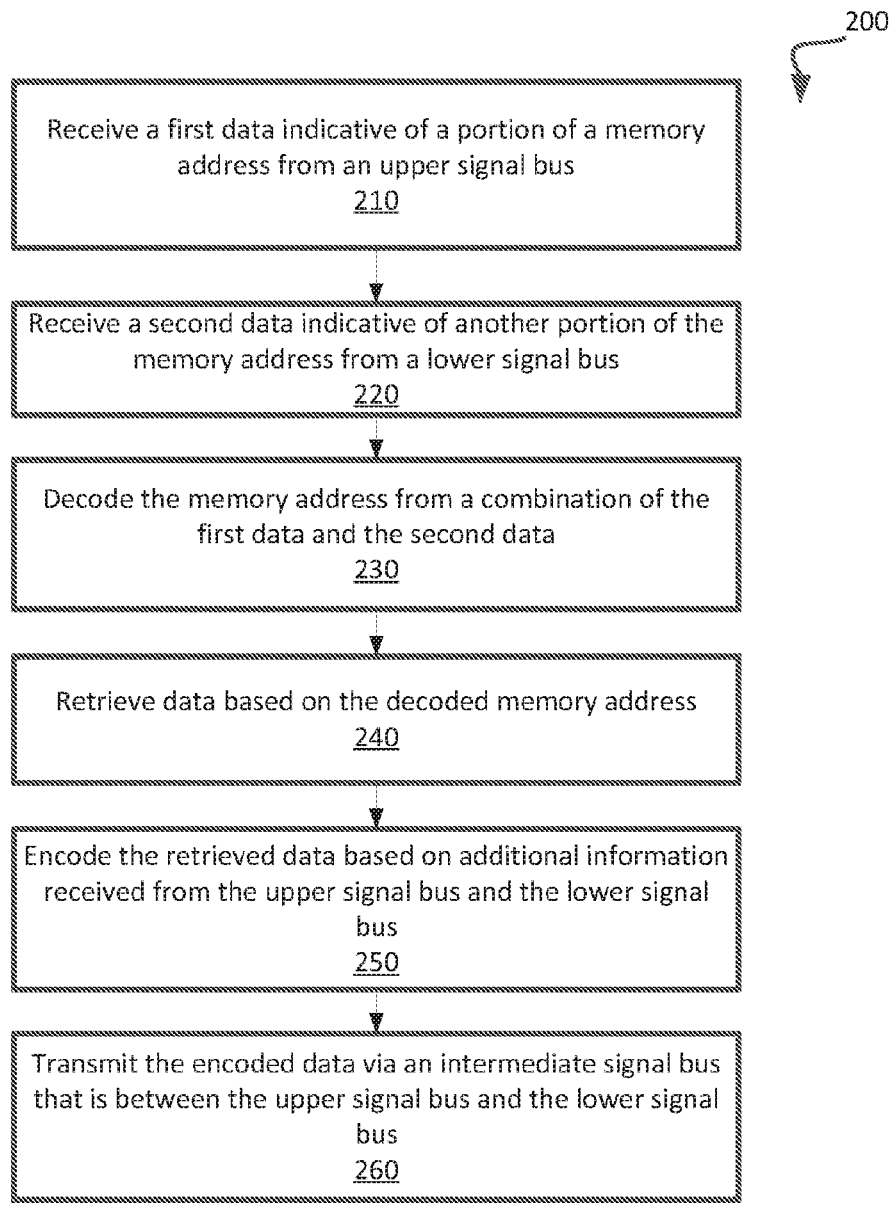
FIG. 2 is a flow diagram of an example method to transmit data from memory components to a memory controller by using memory bus protection in accordance with some embodiments.

FIG. 2 is a flow diagram of an example method 200 to transmit data from memory components to a memory controller by using memory bus protection. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the memory components 110 of the device 100 of FIG. 1.

As shown in FIG. 2, the method 200 may begin, at operation 210, with the processing logic receiving a first data indicative of a portion of a memory address from an upper signal bus. The first data may be a first portion of an encoded memory address that has been transmitted by a memory controller. In some embodiments, the first data can be further indicative of a portion of a memory command. The upper signal bus may be located at a particular metal layer of an integrated circuit. At operation 220, the processing logic may receive a second data indicative of another portion of the memory address from a lower signal bus. In some embodiments, the second data can be further indicative of another portion of the memory command. The second data may be a remaining second portion of the encoded memory address and a remaining second portion of the memory command that has been transmitted by the memory controller. Furthermore, the lower signal bus may be located at a different metal layer of the integrated circuit than the upper signal bus. In some embodiments, the lower signal bus may be located at a metal layer that is below the metal layer of the upper signal bus. For example, the lower signal bus may be located within a metal layer that is two layers beneath the metal layer that includes the upper signal bus (e.g., at least one additional metal layer is between the layer with the lower signal bus and the layer with the upper signal bus).

At operation 230, the processing logic may decode the memory address from a combination of the first data and the second data. For example, an address decoder may combine the first data received from the upper signal bus and the second data received from the lower signal bus and may decode the combination of the first data and the second data to generate a memory address. At operation 240, the processing logic may retrieve data based on the decoded memory address. For example, the data stored at the memory address of the memory may be retrieved. In some embodiments, the data may be retrieved based on a combination of the different portions of the memory command that have been received from the upper signal bus and the lower signal bus. For example, the combination of the portions of the memory command can specify a reading or retrieving of the data at the decoded memory address. The data may be secret data such as a cryptographic key or other such information used during the operation of a device. At operation 250, the retrieved data may be encoded based on additional information received from the upper signal bus and the lower signal bus. The additional information may be a random value (i.e., a nonce value) that is used to encrypt or encode data. In some embodiments, the random value may be received with the first data and the second data. For example, a first portion of the random value may be received with the first data from the upper signal bus and a second portion of the random value may be received with the second data from the lower signal bus. The portions of the random value may then be combined to generate the random value or nonce value that is used to encode the data.

Subsequently, at operation 260, the processing logic may transmit the encoded data via an intermediate signal bus that is between the upper signal bus and the lower signal bus. For example, the encoded data may be returned to the memory controller via the portion of the memory bus that is vertically oriented between the upper signal bus and the lower signal bus.

Figure 3:
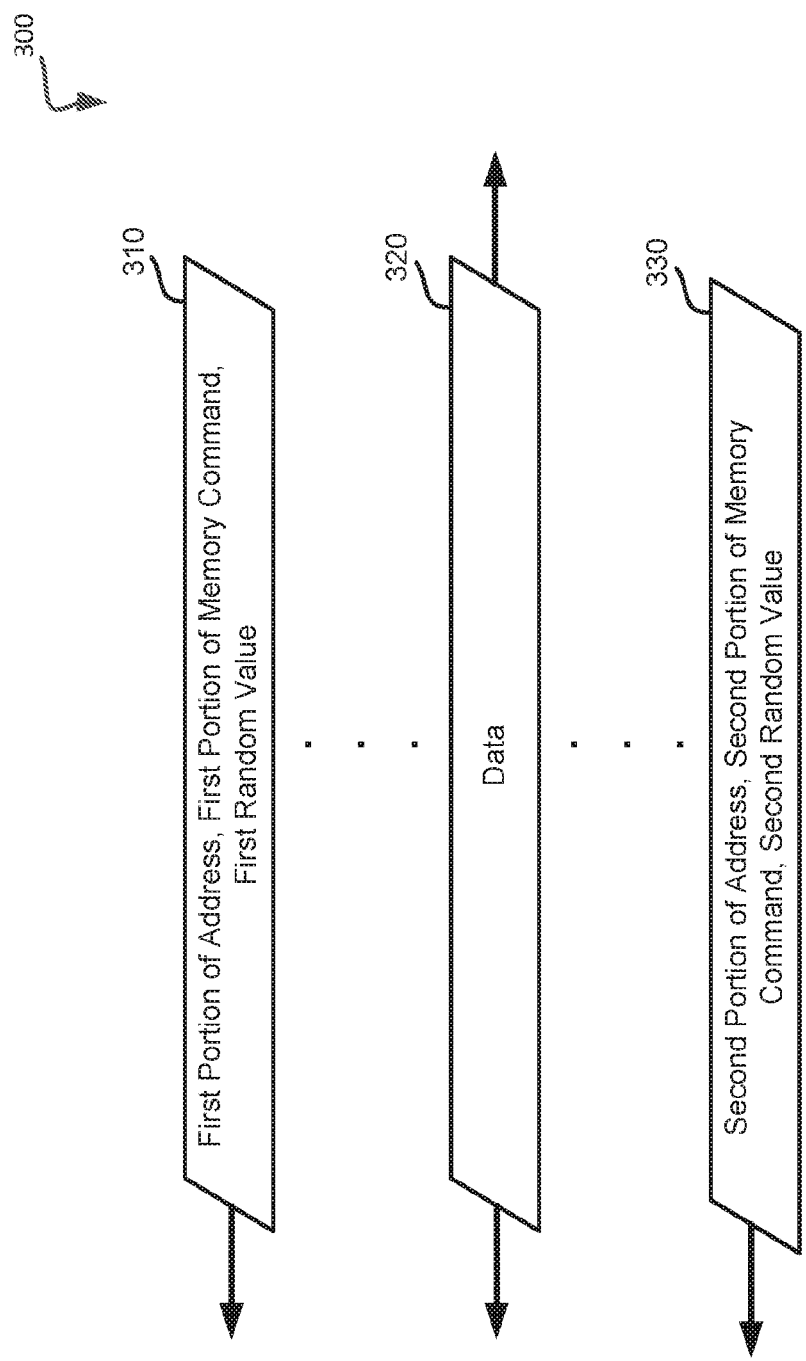
FIG. 3 illustrates a protection of a portion of a memory bus at which data is transmitted in accordance with some embodiments of the present disclosure.

FIG. 3 illustrates a protection of a portion of a memory bus 300 at which data is transmitted. As shown, the memory bus 300 may include different portions or groups of signals at different layers of an integrated circuit. Each layer of the memory bus 300 may be a layer that is capable of transmitting or receiving data. For example, each layer may correspond to a different metal layer with metal interconnect corresponding to different signals of the memory bus 300.

As shown, the memory bus 300 may include portions or groups of signals at an upper layer 310, an intermediate layer 320, and a lower layer 330. In some embodiments, each of the different layers may be adjacent layers of the same type. For example, the upper layer 3110 may be a fifth metal layer of the integrated circuit (i.e., a metal-5), the intermediate layer 320 may be a fourth metal layer (i.e., metal-4), and the lower layer 330 may be a third metal layer (i.e., metal-3.). In some embodiments, one or more other metal layers may be located between the different layers of the memory bus 300. For example, the upper metal layer may be the fifth metal layer, the fourth metal layer may be another layer that does not include any signal of the memory bus 300, and the third metal layer may then be the intermediate layer 320 while the second metal layer (i.e., metal-2) carries the lower layer 330.

In some embodiments, the signals of each layer of the memory bus 300 may overlap in the vertical direction of the integrated circuit. For example, each of the upper layer 310, intermediate layer 320, and lower layer 330 may include the same number of signals that are in the same or similar pattern. For example, each of the layers 310, 320, and 33 may include 32 signals (i.e., connections) to represent 32 bits of data and that each follows the same or similar route or pattern (i.e., layout) on their respective layer between the memory controller and the memory components. Thus, the layout of signals at each of the layers may be considered to overlap (in vertical orientation, i.e., looking "top down" into the with respect to each other. As a result, the signals of the intermediate layer 320 may be considered to be shielded by the signals of the upper layer 320 and the lower layer 330.

As shown in FIG. 3, the upper layer 310 is used to transmit command/address signals between the controller and memory, including a first portion of a memory command/address and optionally a first random value. Similarly, the lower layer 330 is used to transmit command/address signals between the controller and memory, including a second portion of the memory command/address and optionally a second random value. Thus, each of the upper layer 310 and the lower layer 330 can be used to transmit a portion of a memory command and a corresponding portion of a memory address. Each of the upper layer 310 and the lower layer 330 may be unidirectional to transmit data from the memory controller to the memory components. The signals of the memory bus at the intermediate layer 320 may be used to transmit data (i.e., data associated with the memory command/address) between the memory controller and the memory components. For example, data retrieved from the memory as part of a read command may be transmitted from the memory to the memory controller over the signals of the memory bus 300 at the intermediate layer 320 while data to be stored at the memory as part of a write command may be transmitted from the memory controller to the memory via the signals at the intermediate layer 320 of the memory bus 300.

In some embodiments, the memory address may be split among the group of signals at the upper layer 310 and the lower layer 330 (i.e., the command/address signals). For example, the command/address signals at the upper layer 310 may transmit a portion of the memory address (e.g., even bits) and the address signals at the lower layer 330 may transmit the remaining portions of the memory address (e.g., odd bits). Each bit may be transmitted over a separate signal or wire, or the bits may be time-division multiplexed on the signal wires. In some embodiments, the address signals at each of the upper layer 310 and the lower layer 330 may be based on a combination of a portion of the memory address and the random value that has been generated. For example, the address signals of the upper layer 310 may transmit bits that are based on the portion of the memory address (e.g., even bits) that are combined with an encoding word. For example, an exclusive-OR (XOR) operation between the portion of the memory address and the encoding word may be performed and each of the resulting bits may be transmitted over as separate signal of the address signals. In this embodiment, the encoding word may be based on the random value. Further details with respect to the encoding word are described below.

In some embodiments, the command/address signals at the upper layer 310 and the lower layer 330 may further include a cyclic redundancy check (CRC) value. The CRC operation may be an error detection operation that detects any changes to data that has been received. For example, the CRC value may be based on the upper-layer data before the data has been transmitted. In some embodiments, the CRC value may be based on a combination of the portion of the memory address for the respective address signals at the respective layer and the respective random value. The CRC value may be generated by the memory controller and transmitted with the portion of the memory address and the random value and the receiver (e.g., a CRC circuit at the memory components) may generate another CRC value based on the received portion of the memory address and the random value. If the generated CRC value matches the CRC value that was received, then the data at the memory address may be retrieved. Otherwise if the generated CRC value does not match the CRC value that was received, then the data at the memory address may not be retrieved as the mismatching of the CRC values may indicate that a portion of the memory bus has been compromised by an attacker.

As such, the memory bus may include signals at different layers of the integrated circuit. The layer that includes signals to transmit data between the memory and the memory controller may be between layers that includes signals used to transmit memory address information from the memory controller to the memory.

Figure 4:
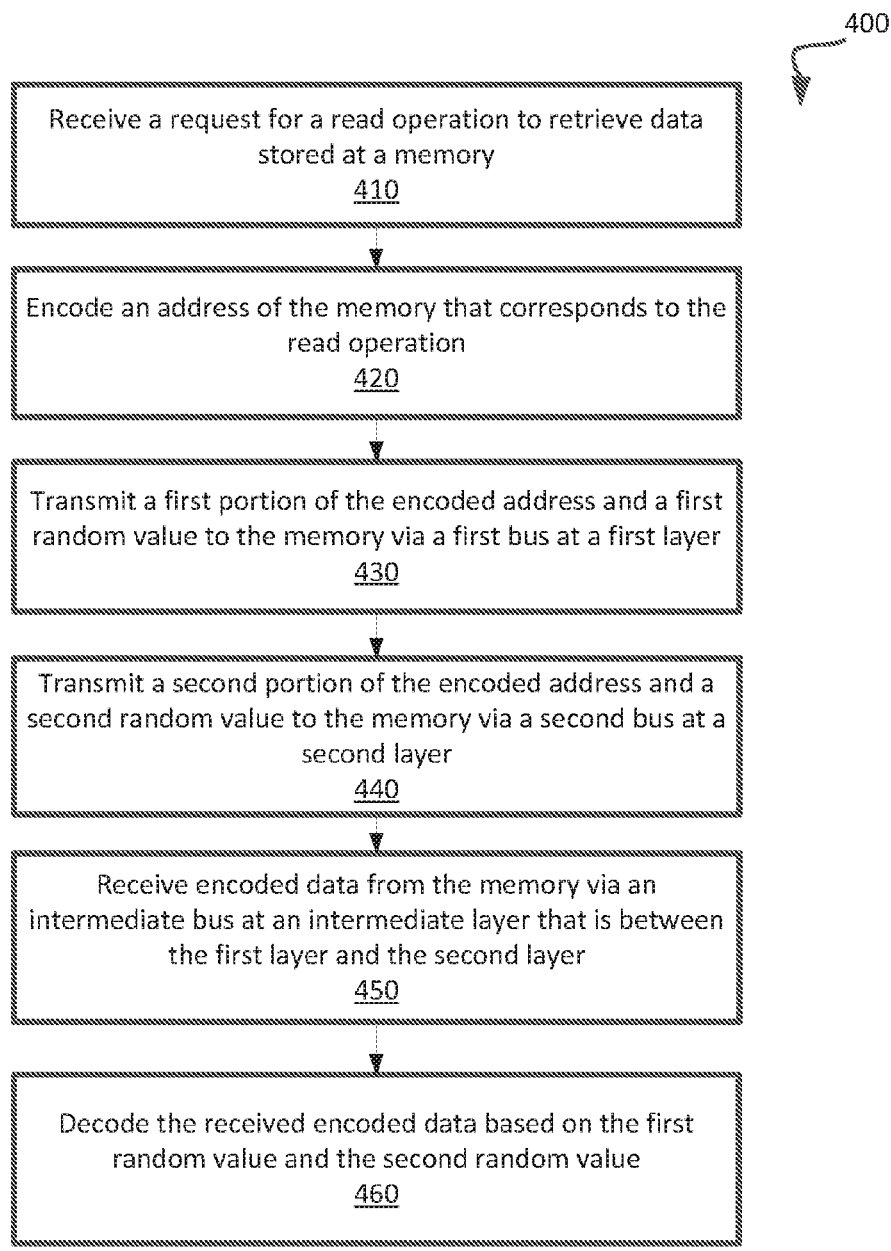
FIG. 4 is a flow diagram of an example method to transmit data from a memory controller to memory components by using memory bus protection in accordance with some embodiments of the present disclosure.

FIG. 4 is a flow diagram of an example method 400 to transmit data from a memory controller to memory components by using memory bus protection. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the memory controller 120 of the device 100 of FIG. 1.

As shown in FIG. 4, the method 400 may begin, at operation 410, with the processing logic receiving a request for a read operation to retrieve data stored at a memory. The read operation may be received in response to a request to perform a particular operation at the device that is to utilize secret data such as a cryptographic key stored at the memory. At operation 420, the processing logic may encode an address of the memory that corresponds to the read operation. For example, the read operation may specify an address of the data that is to be retrieved from the memory. The address may then be encoded and, at operation 430, the processing logic may transmit a first portion of the encoded address and a first random value to the memory via a first bus at a first layer. The first bus may be a portion of a memory bus that is distributed through multiple layers. The first bus may be referred to as a first address bus. The first random value may be generated by a random number generator. At operation 440, the processing logic may transmit a second portion of the encoded address and a second random value to the memory via a second bus at a second layer. The second random value may be generated by the random number generator. The second bus may be referred to as a second address bus. In some embodiments, each of the first random value and the second random value may be stored at a memory of the controller. In some embodiments, a single random value may be generated and separated into the first random value and the second random value.

At operation 450, the processing logic may receive encoded data from the memory via an intermediate bus at an intermediate layer that is between the first layer and the second layer. The data may be encoded by using the first random value and the second random value that was transmitted form the memory controller via the first bus and the second bus. The intermediate bus may be referred to as a data bus. Subsequently, at operation 460, the processing logic may decode the received encoded data based on the first random value and the second random value. For example, the first random value and the second random value may be stored in a memory of the memory controller and retrieved when the encoded data has been received from the memory.

In some embodiments, the first random value and the second random value are generated for each read operation that is transmitted from the memory controller. For example, for a first read operation, a first encoded memory address and a first and second random value may be transmitted over the memory bus. The first and second random value may then be used to decode the received data. For a subsequent second read operation, a second encoded memory address and a different first and second random value may be transmitted over the memory bus and the different first and second random value may be used to decode the second data.

As previously described, an encoding function or operation may be used to generate an encoding word. In some embodiments, the encoding function or operation may utilize a linear feedback shift register (LFSR). For example, a quad Galois LFSR (e.g., being based on four LFSRs) may be utilized. The random values generated by the memory controller may be used to seed or provide an initial value to the quad LFSR. Eight LFSR operations may be performed and the resulting states of each of the four LF SRs may be utilized as the encoding word. Thus, the quad LFSR may be used to mix the bits of the random value before being transmitted to the memory components. Furthermore, in some embodiments, the data bus signals may be scrambled based on the output of the quad LFSR. For example, the data bus signals may utilize the scrambling operation that performs an XOR operation between the data and the resulting output or states of the quad LFSR.

Figure 5:
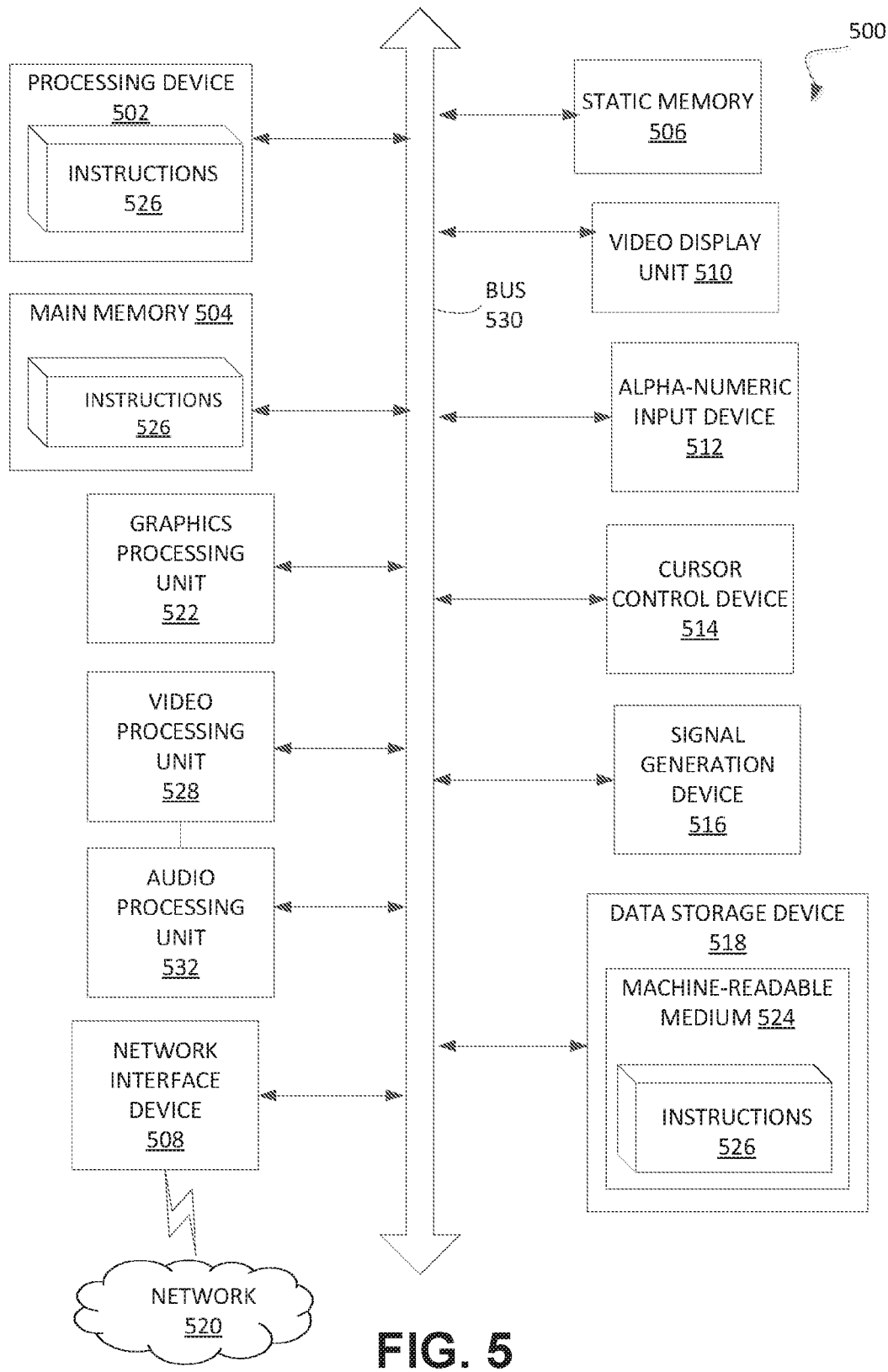
FIG. 5 illustrates a block diagram of an embodiment of a computer system in which some embodiments of the disclosure may operate.

FIG. 5 illustrates an example of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 614 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality as described herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, the present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An integrated circuit comprising:
  a memory;
  a memory controller;

a first address bus located in an upper layer of the integrated circuit, wherein the first address bus is to receive a first portion of a memory address from the memory controller;

a second address bus located in a lower layer of the integrated circuit, wherein the second address bus is to receive a second portion of the memory address from the memory controller; and a data bus located in an intermediate layer of the integrated circuit, wherein the data bus is to receive data corresponding to the memory address from the memory and transmit the data to the memory controller, and wherein the intermediate layer is between the upper layer and the lower layer, and wherein a layout of signals of the data bus vertically overlaps with a layout of signals of the first address bus and a layout of signals of the second address bus.

2. The integrated circuit of claim 1, wherein the first address bus is further to receive a first portion of a memory command and the second address bus is further to receive a second portion of the memory command.

3. The integrated circuit of claim 1, wherein the first address bus is further to receive a first random value from the memory controller, and wherein the second address bus is further to receive a second random value from the memory controller, and wherein the data transmitted to the memory controller via the data bus is encoded based on the first random value and the second random value.

4. The integrated circuit of claim 1, wherein the memory controller further comprises an encoder to encode the first portion of the memory address and the second portion of the memory address, and wherein the memory is associated with a decoder to decode the encoded first portion of the memory address and the encoded second portion of the memory address.

5. The integrated circuit of claim 1, wherein the memory controller is to generate a first cyclic redundancy check (CRC) value based on the first portion of the memory address and a second CRC value based on the second portion of the memory address, and wherein the first CRC value is transmitted to the memory via the first address bus and the second CRC value is transmitted to the memory via the second address bus.

6. The integrated circuit of claim 1, wherein the memory is associated with receiving a first random value with the first portion of the memory address from the first address bus located in the upper layer and a second random value with the second portion of the memory address from the second address bus located in the lower layer, and wherein the data transmitted via the data bus in the intermediate layer is encoded based on a combination of the first random value and the second random value.

7. The integrated circuit of claim 1, wherein the first address bus and the second address bus correspond to a shielding for the data bus.

8. A method comprising:

receiving a memory address associated with a memory;

transmitting a first portion of the memory address to the memory, the first portion of the memory address being transmitted via a first address bus located in an upper layer of an integrated circuit associated with the memory;

transmitting, by a processing device, a second portion of the memory address to the memory, the second portion of the memory address being transmitted via a second address bus located in a lower layer of the integrated circuit; and receiving data at the memory address from the memory via a data bus that is located at an intermediate layer of the integrated circuit, wherein the intermediate layer is between the upper layer and the lower layer of the integrated circuit, and wherein a layout of signals of the data bus in the intermediate layer vertically overlaps with a layout of signals of the first address bus and a layout of signals of the second address bus.

9. The method of claim 8, further comprising:

transmitting a first portion of a memory command via the first address bus; and transmitting a second portion of the memory command via the second address bus.

10. The method of claim 8, further comprising:

generating a first random value, wherein the first random value is transmitted to the memory via the first address bus; and generating a second random value, wherein the second random value is transmitted to the memory via the second address bus, and wherein the data received via the data bus is based on the first random value and the second random value.

11. The method of claim 8, further comprising:

encoding the first portion of the memory address and the second portion of the memory address, wherein the transmitting of the first portion of the memory address is based on the encoded first portion of the memory address and the transmitting of the second portion of the memory address is based on the encoded second portion of the memory address.

12. The method of claim 8, further comprising:

generating a first cyclic redundancy check (CRC) value based on the first portion of the memory address, and generating a second CRC value based on the second portion of the memory address, and wherein the first CRC value is transmitted to the memory via the first address bus and the second CRC value is transmitted to the memory via the second address bus.

13. The method of claim 12, wherein the receiving of the data at the memory address from the memory via the data bus that is located at the intermediate layer of the integrated circuit is based on the first CRC value and the second CRC value.

14. The method of claim 8, wherein the first address bus and the second address bus correspond to a shielding for the data bus.

15. A method comprising:

receiving a first portion of a memory address of a memory, the first portion of the memory address being transmitted via a first address bus located in an upper layer of an integrated circuit associated with the memory;

receiving a second portion of the memory address of the memory, the second portion of the memory address being transmitted via a second address bus located in a lower layer of the integrated circuit;

identifying, by a processing device, data corresponding to the memory address based on the first portion of the memory address and the second portion of the memory address; and transmitting the data at the memory address from the memory via a data bus that is located at an intermediate layer of the integrated circuit, wherein the intermediate layer is between the upper layer and the lower layer of the integrated circuit.

16. The method of claim 15, wherein a layout of signals of the data bus in the intermediate layer overlap with a layout of signals of the first address bus and a layout of signals of the second address bus.

17. The method of claim 15, wherein the memory address corresponding to the first portion and the second portion is encoded, the method further comprising decoding the encoded memory address.

18. The method of claim 15, further comprising:
receiving a first cyclic redundancy check (CRC) value with the first portion of the memory address via the first address bus located in the upper layer;
receiving a second CRC value with the second portion of the memory via the second address bus located in the lower layer; and
generating a corresponding CRC value for each of the first portion of the memory address and the second portion of the memory address, and wherein the identifying of the data is based on the corresponding CRC values matching the first CRC value and the second CRC value.

19. The method of claim 15, further comprising:
receiving a first random value with the first portion of the memory address via the first address bus located in the upper layer;
receiving a second random value with the second portion of the memory via the second address bus located in the lower layer; and
encoding the data based on the first random value and the second random value, wherein the transmitting of the data via the data bus corresponds to transmitting the encoded data.

20. The method of claim 15, wherein the first address bus and the second address bus correspond to a shielding for the data bus.

* * * * *